United States Patent [19]

Thompson

[11] Patent Number: 4,670,079
[45] Date of Patent: Jun. 2, 1987

[54] METHOD OF FORMING A WALKING-SURFACE PANEL

[76] Inventor: Thomas L. Thompson, 1645 Monrovia St., Costa Mesa, Calif. 92627

[21] Appl. No.: 702,404

[22] Filed: Feb. 15, 1985

Related U.S. Application Data

[63] Continuation-in-part of Ser. No. 444,802, Jul. 20, 1982, Pat. No. 4,517,239.

[51] Int. Cl.⁴ .................. B32B 31/12; C09J 5/04
[52] U.S. Cl. .................... 156/307.5; 156/315; 156/330; 156/332; 428/703
[58] Field of Search ............. 156/330, 332, 304.5, 156/62.2, 182, 307.3, 307.5, 314, 315; 428/480, 703, 908.8; 52/578; 14/73; 427/393.6

[56] References Cited

U.S. PATENT DOCUMENTS

| | | | |
|---|---|---|---|
| 3,308,725 | 3/1967 | Nagin et al. | 14/73 |
| 4,361,616 | 11/1982 | Böners | 428/703 |
| 4,388,361 | 6/1983 | Vassalli | 156/304.5 |
| 4,555,292 | 11/1985 | Thompson | 156/330 |

FOREIGN PATENT DOCUMENTS 158184 12/1980 Japan .................. 428/703

*Primary Examiner*—Michael Wityshyn
*Attorney, Agent, or Firm*—Price, Gess & Ubell

[57] ABSTRACT

A fiber-cement/plywood surface and method of providing a preformed surface material for flooring, decking, walkways and roadways, more particularly for use with marine dock structures. The method includes applying a coating of a catalized resin material over one surface of a sheet of plywood substructure so as to seal the substructure as the resin hardens, and also coating one surface of a fiber-cement sheet with a catalized resin material and allowing it to harden. A bonding agent, which comprises a catalized resin material mixed with a thickening agent such as mill fibers or finely chopped fiberglass strands, is applied between the two facing resin surfaces of the respective plywood sheet and the fiber-cement sheet, whereby the two sheets are bonded together so as to form a single, somewhat-resilient, weatherproof and wear-resistant structure or panel. An alternative arrangement is also provided wherein the substructure is a thick plastic foam core encased in a fiberglass and polyester resin.

9 Claims, 6 Drawing Figures

U.S. Patent    Jun. 2, 1987    4,670,079
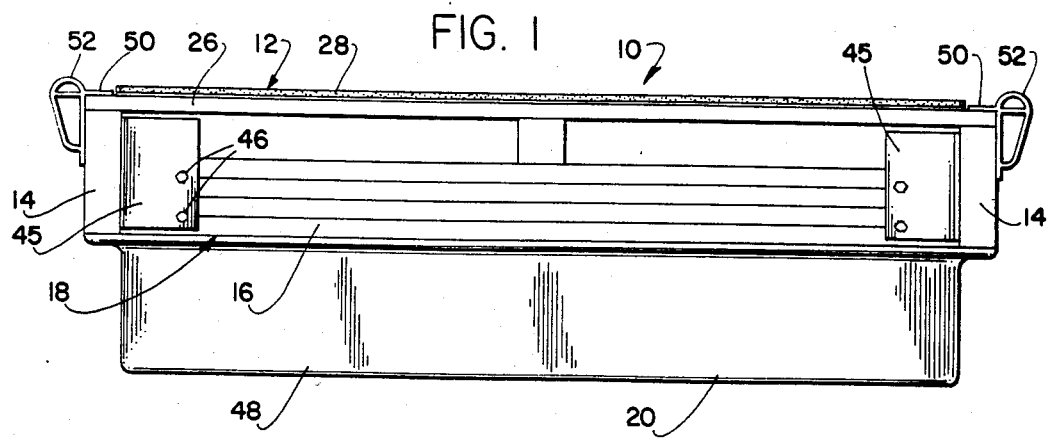
FIG. 1
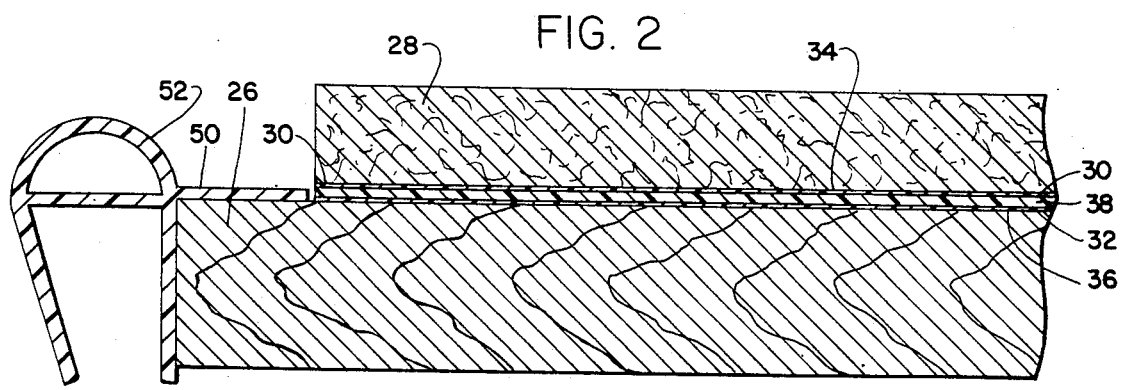
FIG. 2
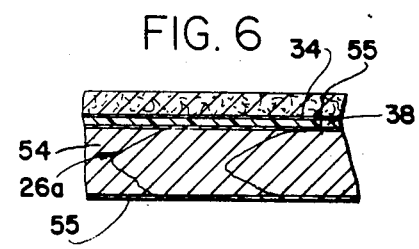
FIG. 4
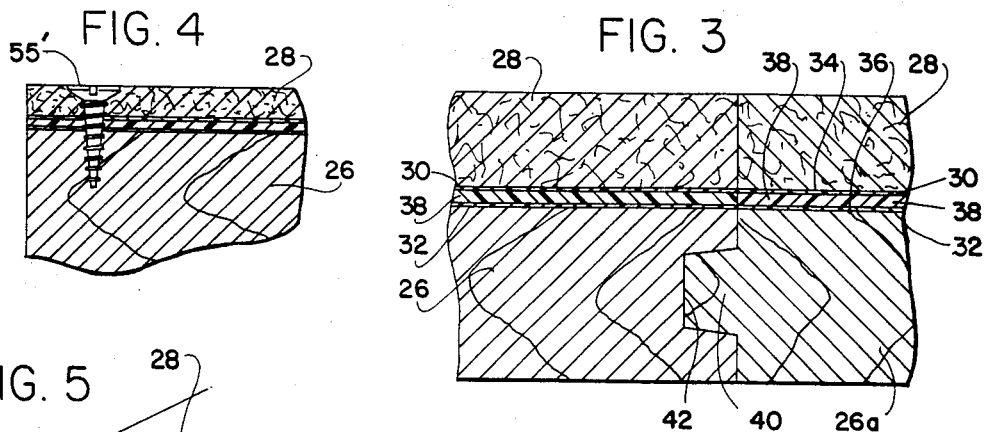
FIG. 3
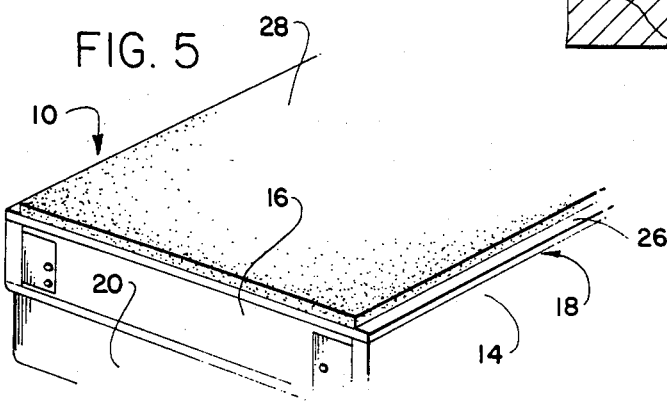
FIG. 5
FIG. 6

METHOD OF FORMING A WALKING-SURFACE PANEL

CROSS-REFERENCE TO RELATED APPLICATION

This is a continuation-in-part of pending application Ser. No. 444,802 entitled Fiber-Cement/Plywood Walking Surface, filed July 20, 1982, now U.S. Pat. No. 4,517,239.

BACKGROUND OF THE INVENTION

1. Field of the Invention

This invention relates to a structural panel, and more particularly to a panel having a combination sheet of plywood and sheet of fiber cement sealed and bonded together to form a resilient weatherproof and wear-resistant structure for areas subjected to heavy foot traffic, including marine decking.

2. Description of the Prior Art

As is well known in the art, various problems and difficulties are being encountered in providing suitably structured all-weather surfaces which are able to withstand heavy pedestrian traffic, particularly with respect to those surfaces associated with marine dock systems.

In this area, various types of surfaces have been tried without success, the two most commonly used surface materials comprising wood products or cement. Surface structures composed of wood are generally formed from a multiplicity of juxtaposed plank members positioned transversely across the deck or walkway.

The cement walkway or surface structure is usually formed in a long rectangular slab configuration having a thickness of from one to two inches. Even though cement slabs are becoming more popular over wood surfaces in the construction of marinas and other floating dock structures, there are two inherent problems that exist. First, cement slabs are very heavy and add considerable weight to an already large and heavy structure; and they are cumbersome and difficult to handle. Second, this type of slab is not resilient and has a tendency to crack when subjected to adverse weather conditions which tend to cause dock fingers and walkways to twist and flex in the turbulent water.

Thus, it can be understood that a solution to these problems is needed to a great degree.

SUMMARY AND OBJECTS OF THE INVENTION

The present invention has for an important object to provide a structural walkway or decking that overcomes the above-mentioned problems, as well as other problems connected with heavily travelled pedestrian surfaces which require light-weight wear-resistant materials.

Another object of the invention is to provide a fiber-cement/plywood panel structure that is lightweight, strong and resilient so that it can flex without cracking.

Still another object of the invention is to provide a fiber-cement/plywood panel for the construction of the decking, particularly for use in marine areas.

A further object of the invention is to provide a fiber-cement/plywood structural panel that can be positioned in a continuous interlocking manner, and can be fabricated to accommodate structural elements required for any particular situation by means of holes cut to allow the elements such as posts and electrical outlets to be mounted in or through the panel.

A still further object of the invention is to provide an apparatus of this character that can be used either as a permanent or as a temporary walkway for pedestrial traffic at building sites; for replacement and/or repair of work walkways or decks that would otherwise need to be reconstructed; and for surfaces of small bridges to span openings in concrete walkways, roadways, marine decks, etc.

Still a further object of the invention is to provide an apparatus of this character whereby a permanent flooring surface can be employed anywhere inside or outside of a building, the surface being weatherproof and wear-resistant yet having the texture and appearance of poured-in-place concrete, without the normal cost of construction or the maintenance.

Another object of the present invention is to provide a fiber-cement/plywood panel that is formed having a first panel member of a predetermined size defining a substructure, wherein the substructure can be formed from a thick sheet of plywood or a sheet of plastic foam encased in a polyester resin coating, and a second panel member composed of a fiber-cement material defining a walking surface. The fiber-cement material can include either asbestos or glass fibers.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a side-elevational view of a floating dock section having the present combination fiber-cement/plywood panel mounted to the surface structure of the deck thereof;

FIG. 2 is an enlarged cross-sectional view taken transversely along the longitudinal edge of the deck;

FIG. 3 is an enlarged cross-sectional view taken longitudinally across the transverse abutting ends of two panels;

FIG. 4 is a cross-sectional view of the panel showing an additional fastening means between the fiber-cement panel section and the plywood panel section;

FIG. 5 is a partial perspective view of the combined panel mounted to a floatable dock section; and FIG. 6 is a cross-sectional view of the alternative arrangement of the present invention.

DESCRIPTION OF THE PREFERRED EMBODIMENT

Referring more particularly to FIG. 1, there is illustrated a section of a typical floatable marine dock, indicated generally at 10, having mounted thereon decking, generally designated at 12, which represents the present invention.

As previously mentioned heretofore, there are several areas of application for which the present invention is well suited; but it is herein shown and described in connection with marine dock structures, since this unique decking is pratically suited for the special conditions and requirements associated with marine-related structures.

FIGS. 1 and 5 show a typical floatable dock 10 formed by opposite disposed longitudinal side walers 14 held in place by transverse timber members 16, defining a continuous rectangular frame structure 18. Attached to the lower or bottom side of the frame structure is a floatation unit 20 having a somewhat rectangular box-like shape.

The deck structure, designated at 22, represents the present invention which comprises a sub-deck 26 having a thickness of between ⅞″ to 1½″, the preferable specification requiring a 1⅛″ thick Grade CC Exterior plywood panel 26, pressure-preservative treated, which is secured to the longitudinal walers 14 by fastening means such as 16d common hot-dip galvanized nails. Affixed to one side of the plywood surface is a layer of top decking 28, consisting generally of a combination fiber-cement material with an approximate thickness of ¼″, having a non-skid surface with a modulus of rupture of 5000 lb./sq. in. along width and 3800 lb./sq. in. along length, a compressive strength of 12,000 lb./sq. in., a tensile strength of 200 lb./sq. in. along width, and 1350 lb./sq. in. along length.

However, a particular method must be followed to form the deck structure so as to provide the permanent bonding of top deck 28 to the plywood sub-deck 26. This method comprises the forming of a relatively thin (¼″) fiber-cement sheet or panel 28 consisting of combining 36 percent Porland cement; 30 percent crushed limestone; 20 percent Possolan (Italian) Volcanic ash; and 14 percent suitable fibrous material ⅝″ long, such as silky glass fibers. This particular composition is highly resistant to salt corrosion, has excellent chemical resistance, and has resilient qualities to prevent cracking when subjected to constant movement, particularly with respect to a floating dock structure supported in a body of water, in which case the panels bend and twist to some extent. When fiber-cement panels are formed with a thicker cross-section, they tend to be less resilient and break more readily.

After the fiber-cement panel 28 is formed, one surface is coated with a catalized resin material which is allowed to harden. This coated surface will be referred to as the undersurface 30. The other surface which is the plywood sub-deck panel 26 is likewise coated with a catalized resin material which is allowed to harden, this coated surface being referred to as the top surface 32 of plywood panel 26. The catalized resin material used for the coating is applied in a thin liquid state.

When undersurface 30 and top surface 32 are both resin-hardened, they define respective bonding layers 34 and 36 which provide a means for sealing the respective surfaces 30 and 32. This allows the fiber-cement panel and the plywood panel to be permanently bonded together by an intermediate bonding-agent layer 38 which is formed from a catalized polyester resin or an epoxy resin, and may include a thickening agent such as mill fibers or finely chopped fiberglass strands, so as to establish a thixotropic condition, allowing the material to be applied by troweling a thick layer over one of the surfaces 30 or 32, but preferred to use a multi-tooth-edged troweling tool, so that the entire surface is evenly covered in order to receive the coated undersurface of the fiber-cement panel. The two panels are brought together in a manner that prevents air pockets from forming between the sheets or panels 28 and 26; and to accomplish this pressure is evenly applied to the panels by any suitable means. One means, for example, is to simply apply adequate pressure on the surfaces of one of the panels so that they will adhere tightly together until the bonding agent has hardened.

This two-part deck panel 12 will then be ready to be handled and employed with any type of structural assembly as required.

Also important in effecting a permanent walking surface is the incorporation of a coupling means between the abutting edges of the finished panel 10. The preferred coupling means, however, comprises a tongue-and-groove arrangement, wherein one abutting end or edge of plywood panel 26 is formed having a transverse tongue member 40 and the opposite end or edge is provided with a matching groove 42, as illustrated in FIG. 3. The grooved end of the plywood panel 26 is thus coupled to the tongue end of plywood panel 26a. Further, by providing an adequate thickness of the tongue and groove 40 and 42, respectively, additional strength is established therebetween so as to support the thin fiber-cement deck in a way that the latter will not be required to perform a structural function, since it is intended to act only as a long-wearing surface and is not designed to bear a vertical load. The tongue-and-groove arrangement further provides a continuous, uninterrupted surface. If the ends thereof were squared off, the abutting panels would move vertically (up and down) independently of each other, which would result in an uneven, discontinuous surface.

It is also contemplated that the fiber-cement panel 28 will be formed so that its width is smaller than the width of the sub-decking 26, as seen in FIGS. 1, 2 and 5. That is, the plywood sub-decking 26 extends outwardly along the longitudinal edges 50. This extension allows bumper strips 52 to be secured thereto.

FIG. 4 illustrates a fastener such as a screw 55′ being employed as an additional means for securing the surface panel 28 to the sub-decking 26, if necessary during the installation thereof.

The manufacture of floating docks is most efficiently accomplished on shore and not in the water. The method generally employed is to build the dock in sections, or modules, which are then placed into the water at the job site where the assembly of the sections is performed. The assembly in this manner requires that much of the deck area of the structure, particularly the decking of what is called the "head walk" is not installed until after the floating dock has been placed in the water, and the assembly of the modules by means of angle clips 45, splice blocks and through-bolts 46 has been accomplished.

Therefore, it is desirable that the laminated fiber-cement/plywood deck sections 10 be pre-built before they are affixed in place on the assembled structure 48. The deck panels 12 are pre-built by the present method into sections that can be put in place by the simple means of affixing these sections with nails or screws to the assembled structure 48 in a one-by-one manner. This enables the worker to interface the tongue of one panel with the groove of the other in a sequential method until the entire deck area has been covered.

This same method of affixing these deck panels is used during the on-shore manufacturing phase of the sections known as "finger" sections which are usually built as complete units, and which need to be assembled to the headwalk only at one end.

Referring to FIG. 6, there is shown a fiber-cement panel having an alternative arrangement wherein the sub-decking 26a comprises a thick core of foam plastic material 54 which is encased in a thin layer of polyester resin impregnated with fiberglass designated at 55. The deck panel 28 is formed, as heretofore described, with a bonding or sealing surface 34.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of forming a walking-surface panel for floating docks and the like, comprising the steps of:
   providing a sheet of fiber-cement which defines the walking surface;
   coating one surface of said fiber-cement sheet with a catalized resin material to seal said surface;
   providing a sheet of plywood having a size substantially the same as that of said fiber-cement sheet;
   coating one surface of said plywood sheet with a catalized resin material to seal said surface; and
   bonding said fiber-cement sheet to said plywood sheet, wherein a bonding material is interposed between said coatings of said sheets.

2. A method as recited in claim 1 wherein said fiber-cement sheet is composed by combining cement, crushed limestone, volcanic ash, and a fibrous material.

3. A method as recited in claim 2, wherein said bonding material interposed between said sheets comprises a catalized epoxy resin.

4. A method as recited in claim 2 wherein said bonding material interposed between said sheets comprises a catalized polyester resin mixed with a thickening agent.

5. A method as recited in claim 4, wherein said plywood sheet is formed having a tongue member along one abutting transverse edge thereof, and a matching groove along the oppositely disposed abutting transverse edge thereof.

6. A method as recited in claim 2, wherein said fiber-cement sheet comprises 36% cement; 30% crushed limestone; 20% volcanic ash; and 14% silky fibrous material.

7. A method as recited in claim 6 wherein said fiber-cement sheet is formed having $\frac{1}{4}$ of an inch thickness.

8. A method as recited in claim 7, wherein said plywood sheet is formed having a thickness of between $\frac{3}{4}$ of an inch and $1\frac{1}{2}$ inch.

9. A method as recited in claim 7, wherein said plywood sheet is formed having $1\frac{1}{8}$ inch thickness.

* * * * *

UNITED STATES PATENT AND TRADEMARK OFFICE
CERTIFICATE OF CORRECTION

PATENT NO. : 4,670,079
DATED : June 2, 1987
INVENTOR(S) : Thomas L. Thompson

It is certified that error appears in the above-identified patent and that said Letters Patent is hereby corrected as shown below:

Column 2, line 5, "pedestrial" should read -- pedestrian --.

Column 2, line 68, "praticularly" should read -- particularly --.

Column 3, line 4, "opposite" should read -- oppositely --.

Column 3, line 62, after "but" insert -- preferably the top surface 32 of the plywood panel. It is further --.

Column 3, line 30, "Porland" should read -- Portland --.

Signed and Sealed this

First Day of March, 1988

Attest:

DONALD J. QUIGG

Attesting Officer

Commissioner of Patents and Trademarks